June 3, 1958  J. FELDMAN ET AL  2,837,565
CHEMICAL PROCESS FOR RECOVERY OF ACIDS
Filed Oct. 29, 1956  2 Sheets-Sheet 1
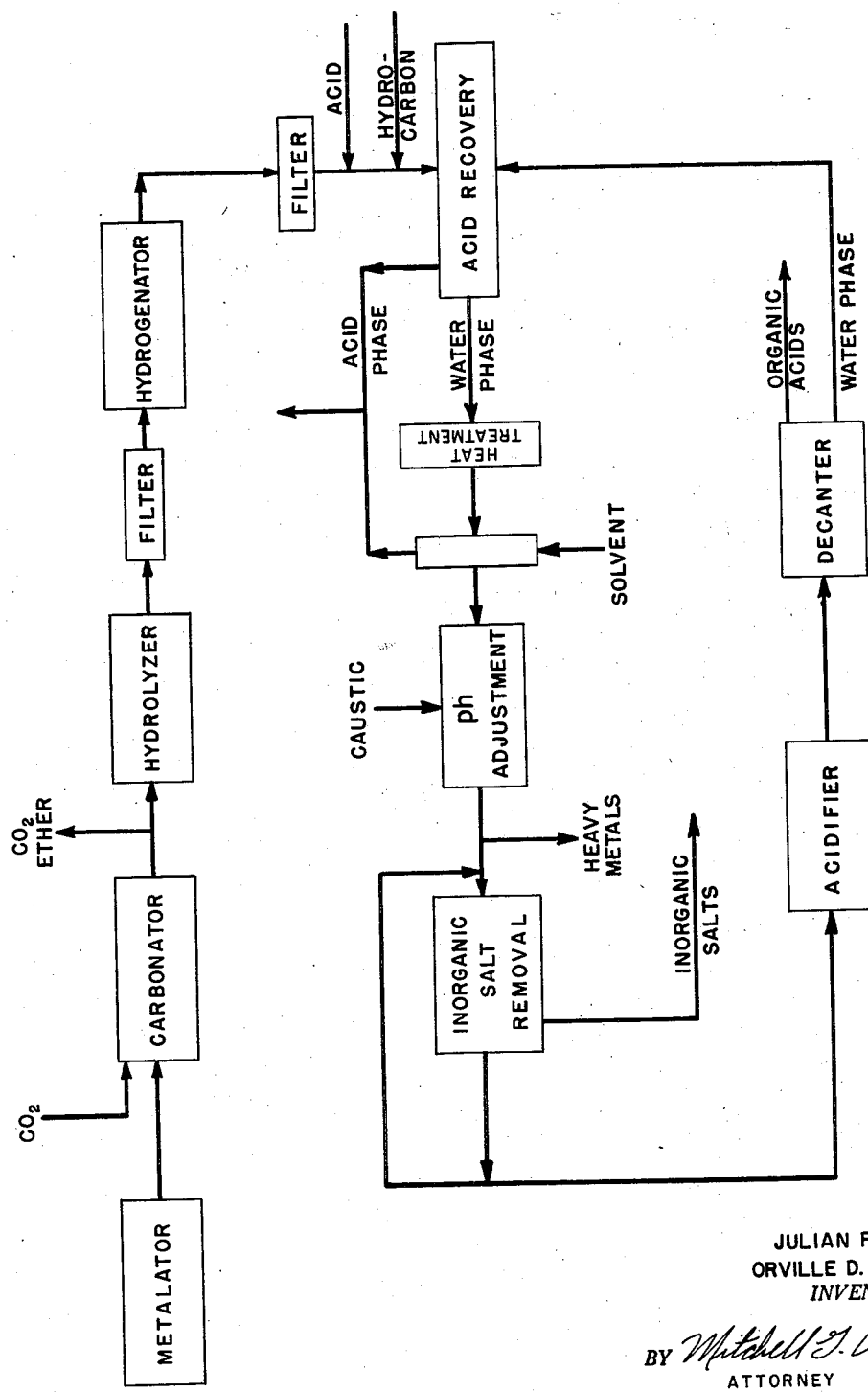
FIG. I
JULIAN FELDMAN
ORVILLE D. FRAMPTON
INVENTORS
BY Mitchell T. Condos
ATTORNEY

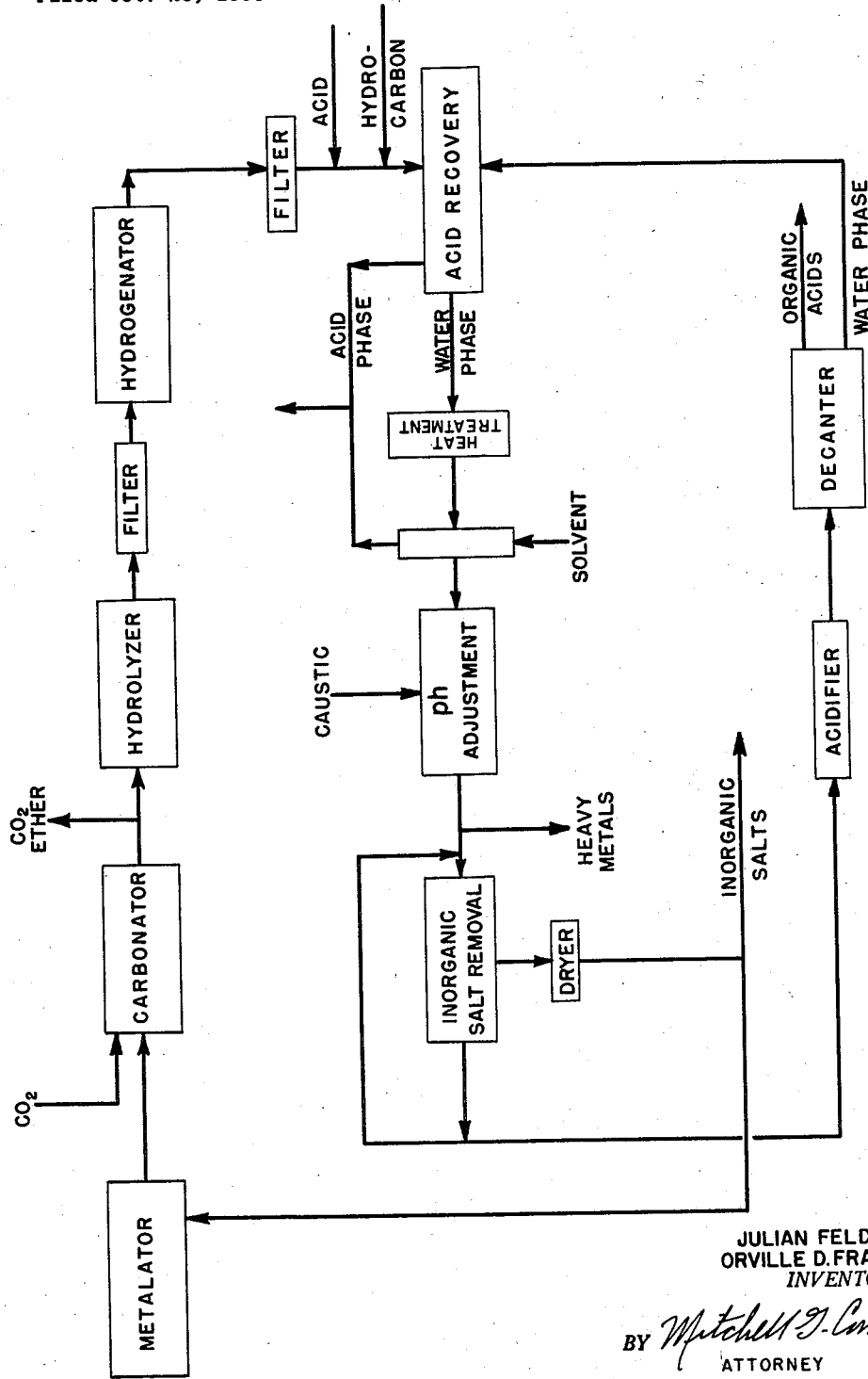

United States Patent Office 2,837,565
Patented June 3, 1958

2,837,565

CHEMICAL PROCESS FOR RECOVERY OF ACIDS

Julian Feldman, Cincinnati, and Orville D. Frampton, Wyoming, Ohio, assignors to National Distillers and Chemical Corporation, a corporation of Virginia Application October 29, 1956, Serial No. 618,875

8 Claims. (Cl. 260—533)

The present invention relates to an improvement in processing of certain compositions comprising water-soluble organic acids and inorganic salts for recovery from such compositions of the organic acids and inorganic salts of improved quality characteristics. More particularly, the invention relates to a process for preparation of desired carboylic acid mixtures with improved recovery of desired acids and other materials used or formed in their production with obtainment of additional advantages including minimization of waste disposal problems normally attendant to recovery of the acids. Still more particularly, the process embodied herein relates to an improvement in a process wherein an olefinic material is reacted with a finely divided alkali metal under conditions to selectively form in high yields the dialkali metal derivatives of dimers of the olefinic material, conversion of such derivatives to salts of dicarboxylic acids, liberation of the free acids from said salts, and utilization in such a pocess of a treatment for recovery of organic acids and certain other components in mixture with the organic acids in a manner whereby loss of desired acids is obviated or substantially minimized and waste disposal problems normally attendant to recovery of the acids are obviated.

The process embodied herein which provides the improvements described more fully hereinafter may be utilized for treatment of mixtures comprising carboxylic acids prepared by carbonation of metal derivatives of olefinic materials and, particularly, carboxylic acid mixtures derived from initial reaction between an olefin and an alkali metal under metalation reaction conditions to selectively form in high yields the dialkali metal derivatives of dimers of the olefin. With respect thereto, the selective dimerization process may be carried out with olefinic materials such as conjugated dienes illustrated by butadiene, isoprene, 4-methyl-1,3-pentadiene, 2-methyl-1,3-pentadiene, and the like. In preferred aspect, the treatment embodied herein is utilized in a process wherein a conjugated diene of from 4 to 8 carbon atoms is reacted with an alkali metal in finely dispersed form under metalation reaction conditions to provide a reaction mixture comprising dialkali metal derivatives of dimers of the diene followed by carbonation of the reaction mixture to produce a carbonated mixture comprising dialkali metal salts having two more carbon atoms per molecule than said dimer, liberation of the acids from their salts, and recovery of the acids and other components of the acid-containing composition in improved manner whereby losses of carboxylic acids are minimized and other advantages are obtained as will be apparent from the description of the invention set forth hereinafter.

For purposes of illustration, and as a particularly important application of this invention is its use in treatment of carboxylic acid mixtures derived from initial reaction between a conjugated diene and an alkali metal in finely dispersed form, the invention is described with emphasis on carboxylic acid mixtures prepared from a method as set forth hereinafter.

In recently developed processes, it has been found that an olefinic hydrocarbon material can be treated with a finely divided alkali metal in a selected ether medium under selected conditions in the presence of a relatively small amount of a polycyclic aromatic hydrocarbon and/or a suitable attrition agent at a temperature preferably below about 0° C. to produce a mixture comprising dimetallo derivatives of the dimerized olefin. For example, in the case of initial reaction between sodium and butadiene, the reaction product comprises a mixture of disodium derivatives of isomeric octadienes; and in use of other diolefins for the initial reaction, such as isoprene, methyl pentadienes, and the like, correspondingly similar reaction mixtures are obtained. In addition to the dimetallo derivatives of the dimers of the diolefin, relatively small amounts of alkali metal derivatives of the diolefin, monoalkali metal derivatives of the dimerized olefin as well as other alkali metal alkenes are formed during the initial reaction between the diolefin and the finely dispersed alkali metal. Thus, upon carbonation, the reaction mixtures is converted to a mixture comprising salts of unsaturated dicarboxylic acids having two more carbon atoms per molecule than the dimerized diolefin, and salts of unsaturated monocarboxylic acids as well as a small amount of salts of diacids having a smaller amount of carbon atoms than the dimer of the diolefin. For example, in the use of butadiene and finely dispersed sodium for the initial reaction, there is produced, upon carbonation of the reaction mixture, a carbonated mixture comprising predominantly the disodio salts of isomeric $C_{10}$ unsaturated dicarboxylic acids, a small amount of unsaturated monocarboxylic acids including $C_5$, $C_9$, $C_{13}$ and higher molecular weight monocarboxylic acids (as well as a small amount of salts of diacids having two more carbon atoms than butadiene).

Such a mixture of unsaturated sodium salts may be subjected to neutralization in an aqueous medium whereby there is produced an organic phase comprising in solution the bulk of the resulting free unsaturated acids and an aqueous phase which normally contains a small amount of carboxylic acids, and inorganic salts formed by the neutralization treatment. Preferably, however, the aqueous mixture comprising the salts of the unsaturated acids is subjected to hydrogenation, and the resulting aqueous mixture of the salts of the corresponding saturated acids is subjected to neutralization whereby there is produced an organic phase containing the bulk of the free carboxylic acids in solution and an aqueous phase comprising water soluble carboxylic acids and water soluble salts formed in the neutralization treatment. Such an aqueous mixture generally contains up to about 10% by weight of the total carboxylic acids liberated in the neutralization treatment. Preferably, however, the neutralization step is carried out in the presence of an aromatic hydrocarbon solvent for the liberated substantially water-insoluble organic acids as presence of such solvent generally minimizes the solvency in the resulting organic phase of inorganic salts formed in the neutralization step. Examples of such a selective solvent include benzene, toluene, xylene, ethylbenzene, cumene, cymene, etc.

With further reference to the aforesaid series of reactions for preparation of mixtures of carboxylic acid mixtures as aforedefined, the alkali metal employed is preferably sodium, although other alkali metals such as potassium or lithium may be employed either alone or in admixture with sodium. Moreover, mixtures of sodium or potassium with other metals such as calcium can also be used. In carrying out the initial metalation reaction, it is necessary that the alkali metal be used initially in a finely divided form and, generally, as a fine dispersion of the alkali metal having an average particle size of less than 50 microns with a size range of five to fifteen microns being quite satisfactory. The dispersion may be conveniently prepared in an inert hydrocarbon as a separate step preliminary to the metalation reaction with the diolefin.

The metalation reaction is carried out in a reaction medium consisting essentially of an ether of a particular class of ethers that appear to possess the common property of serving as promoters of the selective dimerization reaction involved. The ether can be any aliphatic mono ether having a methoxy group, in which the ratio of the number of oxygen atoms to the number of carbon atoms is not less than 1:4. Examples include dimethyl ether, methyl ethyl ether, methyl n-propyl ether, methyl isopropyl ether, and mixtures of such methyl ethers. Certain aliphatic polyethers are also quite satisfactory. These include the acyclic and cyclic polyethers which are derived by replacing all of the hydroxyl hydrogen atoms of the appropriate polyhydric alcohol by alkyl groups. Typical examples are the ethylene glycol dialkyl ethers such as the dimethyl, methyl ethyl, diethyl, and methyl butyl ethers. The simple methyl monoethers, as dimethyl ether, and the dimethyl and diethyl ethers of ethylene glycol are preferred. The ethers employed should not contain any groups such as hydroxyl, carboxyl and the like which are distinctly reactive towards an alkali metal such as sodium. Although the ether may react in some reversible manner, it must not be subject to extensive cleavage as cleavage action destroys the ether, uses up sodium and introduces, into the reacting system, alkali metal alkoxides which, in turn, tend to induce rubber-forming reactions (polymerization) rather than the desired dimerization reaction. Although the reaction medium should consist essentially of the specific ethers, other inert media can be present in limited amounts. In general, these inert media will be introduced with the sodium dispersion as the liquid in which the alkali metal is suspended and will act chiefly as diluents. The concentration of ether in the reaction mixture should at all times be maintained at a sufficient level to have a substantial promoting effect upon the desired dimerization reaction.

It is usually desirable to include in the dimerization reaction mixture at least one supplementary activating material. This material is a relatively small amount of at least one material from the class of polycyclic aromatic hydrocarbons such as naphthalene and phenanthrene, as well as the uncondensed polycyclic compounds such as diphenyl, the terphenyls, dinaphthyl, tetraphenyl ethylene, and the like. The polyphenyl compounds such as diphenyl and the terphenyls and their mixtures have been found to be particularly useful. The amount of the activating hydrocarbon to be used will vary over a range which in every case will be relatively small in comparison with the amount of butadiene undergoing reaction. Concentrations in the range of 1 to 10 weight percent based on the amount of the diolefin are ordinarily quite sufficient. As to the attrition agent for use in such a reaction, its use generally effects an overall increase in reaction rate and improved utilization of the alkali metal. Materials useful therefor include inorganic solids such as alkali metal salts from the classes of halides and sulfates, for example sodium chloride, potassium chloride, sodium sulfate, potassium sulfate and the like. Also useful are metallic and non-metallic oxides which are not reactive with the alkali metal under the conditions of reaction. Thus, sand, diatomaceous earth, rutile, iron oxide, magnesia and alumina may be used. Other materials, inert to the reaction, such as graphite, zircon, and powdered coal are operable.

The reaction temperature for the metalation reaction is preferably held below 0° C. with a temperature range between −20° to −50° C. being particularly preferred.

In one typical method for carrying out the aforedescribed metalation process, the alkali metal (e. g., sodium) dispersion is initially prepared by placing an inert hydrocarbon such as isooctane in a suitable vessel with the appropriate amount of sodium. The mixture is heated in a surrounding bath or otherwise until the sodium has melted (M. P., 97.5° C.). Then a suitable high speed agitator is started and, preferably, an emulsifier consisting, for example, of ½% (based on sodium) of the the dimer of linoleic acid is added. After a short period of agitation, a test sample of the dispersion shows the particle size to be in the 5 to 15 micron range. The stirring is stopped and the dispersion is allowed to cool to room temperature. This dispersion is now ready to be used in the selective dimerization. Inert liquids such as dibutyl ether, normal octane and straight run kerosenes, may be employed as suspension media for the dispersion. Any such dispersion having sufficiently finely divided alkali metal such as sodium, potassium, or lithium will suffice. Other well-known emulsifiers or dispersing substances may be used instead of the dimeric linoleic acid as the dispersing agent.

The alkali metal dispersion is added to the ether diluent which is pre-cooled to and preferably maintained between −20° C. to −50° C. It is only necessary to employ an amount of dispersed alkali metal stoichiometrically equal to the reactant to be dimerized, although excesses of up to 10% may be desirable.

Following addition of the dispersion to the ether, the olefinic hydrocarbon is added, preferably slowly and at approximately the same ratio as that at which it reacts with the alkali metal. For maximum reaction rates of dimerization, it is desirable to maintain constant agitation of the reaction mixture.

Under the aforesaid reaction conditions, the dialkali metal derivatives are rapidly and selectively formed and, generally, are formed as slurries of the dialkali metal derivatives of the dimer of the olefin in the reaction medium. At the same time, during the course of the reaction, minor amounts of alkali metal-alkenes and -alkadienes are formed. These metallic derivatives can then be carbonated to mixtures containing the salts of dicarboxylic acids, having two more carbon atoms per molecule than a dimer of the diolefin, and minor amounts of salts of unsaturated monocarboxylic acids and dicarboxylic acids having two more carbon atoms than the olefin reactant.

The carbonation may be carried out by subjecting the metallo derivatives to contact with gaseous carbon dioxide, by contact with solid carbon dioxide or by means of a solution of carbon dioxide in a suitable inert liquid. The temperature for carbonation should preferably be controlled below 0° C. to avoid the formation of unwanted by-products. This carbonation forms chiefly the dimetallic salts of unsaturated aliphatic dicarboxylic acids containing two more carbon atoms than the dimetallic dimers from which they are produced. Thus, in the use of butadiene, there results by this method the selective production of the salts of $C_{10}$ unsaturated aliphatic dicarboxylic acids, and in minor proportions, the salts of unsaturated monocarboxylic acids comprised chiefly of $C_5$, $C_9$, and $C_{13}$ unsaturated acids and salts of diacids having two more carbon atoms per molecule than butadiene.

The carbonated mixture comprising the salts of unsaturated aliphatic dicarboxylic acids and of unsaturated monocarboxylic acids is then mixed with an excess of hot water to destroy unreacted alkali metal and to dissolve the salts of the organic acids and, when a water soluble attrition agent is used, to also dissolve the attrition agent. The resulting aqueous solution is then subjected to hydrogenation whereby the organic acid salts are converted to the corresponding saturated salts, and the free acids are then liberated by neutralization with a mineral acid. Alternatively, the salts may be subjected to neutralization to free the organic acids followed by hydrogenation of the free acids. In either case, there results from the neutralization an organic phase containing the bulk of the liberated organic acids and an aqueous phase containing, in solution, water-soluble organic acids, water soluble salts formed in the neutralization step, and, when used, the water soluble attrition agent. Under such conditions, and although the bulk of the carboxylic acids dissolve in the resulting organic phase, a small amount (e. g., up to about 10% by weight of the total organic acids) normally remains in the aqueous phase. As a result of the neutralization operation carried out in an aqueous medium, and preferably in presence of a suitable liquid hydrocarbon, inorganic salt formation occurs in the liberation by the mineral acid of the carboxylic acids from their salts. Such inorganic salts, being water soluble, are dissolved in the aqueous phase which, as aforesaid, also contains in solution a small amount of carboxylic acids. Additionally, when a water soluble attrition agent has been employed in the metalation reaction the aforesaid aqueous phase also contains the attrition agent in solution.

In general, and mainly due to the aforedescribed reactions being carried out in metal vessels and the transference of material in metal conduits, along with extraneous metals present in reactants and reaction aids, the aqueous phase contains dissolved contaminant water-soluble salts of metals, including salts of heavy metal such as iron, nickel, chromium, molybdenum, etc.

In accordance with this invention, an aqueous phase obtained as aforedescribed is subjected to a treatment that obviates or minimizes the loss of desired carboxylic acids therein and provides for recovery of the desired inorganic salts from the aqueous phase in a manner whereby such salts are of improved quality characteristics while, at the same time, minimizing waste disposal problems normally attendant to acid recovery operations. More specifically, and in accordance with this invention, an aqueous phase containing dissolved organic acids and inorganic salts as aforediscussed is subjected to a novel combination treatment including removal of contaminant metals while converting the organic acids to water-soluble, relatively non-volatile salts, followed by subjecting the resulting aqueous solutions (substantially freed of contaminant metals) to a treatment (e. g., to remove water) to an extent that crystallization of inorganic salts therefrom is effected while concentrating the organic salts and to provide a resulting aqueous phase more concentrated with respect to the water-soluble organic acid salts than the aqueous phase subjected to the treatment to crystallize out the inorganic salts. In further accordance with this invention, the inorganic salts that are crystallized out and which are of improved quality characteristics as a result of the process embodied herein may be dried and, when the described metalation process is carried out with a solid water-soluble attrition agent, the thus recovered, dried inorganic salt can be recycled to the metalation stage of the described process in which the reaction between the diolefin and alkali metal is carried out. As to the aqueous phase of increased concentration with respect to the organic acid salts and which phase also still contains some inorganic salts, i. e., water-soluble (e. g., $Na_2SO_4$) salts formed in the described neutralization step and, when used, a water-soluble attrition agent (e. g., $Na_2SO_4$), a portion of such an aqueous phase is, in accordance with this invention, recycled in the process subsequent to the removal of the contaminant metals but prior to the step in which the inorganic salt crystallization is effected and the remainder of the aqueous phase containing the increased concentration of dissolved organic acid salts is subjected to treatment for recovery of the organic acids. Thus, the remainder may be acidified (e. g., to a pH of 1 to 3) to liberate the organic acids from their salts. The resulting acidified composition containing organic acids is then subjected to treatment, such as by decantation, to recover the organic acids and the aqueous portion of the acidified composition in the decanter is recycled to the process, at a stage therein following the hydrogenation step (but not subsequent to the step wherein the aqueous phase is treated with a suitable alkali to remove contaminant metals). Preferably, the aqueous portion of the acidified composition from which the organic acids have been removed is recycled to the process to the step wherein the product from the hydrogenation step is neutralized, preferably in presence of an aromatic liquid hydrocarbon, to effect formation of an organic phase and the aqueous phase which is treated as described herein for contaminant metal removal.

In another embodiment, the portion of the aqueous phase (from the crystallization step) which is not recycled may be solvent extracted with a selective solvent for the organic acid using solvents such as ether, isophorone, sec.-butyl alcohol, quinoline, etc. In this method for organic acid removal, the solvent is substantially completely removed from the solvent extracted aqueous phase which is recycled to the process.

In order to further describe the invention, several embodiments by which it may suitably be carried out are illustrated in the drawings wherein Figure I sets forth in schematic manner a flow system useful for practice of an embodiment of the invention for a process as aforedescribed in which an attrition agent is not used or, if used, is a water-insoluble material and wherein Figure II illustrates a flow system adapted for practice of the invention with use of a water-soluble attrition agent in the metalation reaction. It should be understood, however, that use of such embodiments is for the purpose of illustrating and not for limiting the invention.

In accordance with the invention, the aqueous phase is subjected to an elevated temperature for a period of time sufficient to convert a substantial amount of the water-soluble organic acids to toluene-soluble diacids (mainly $C_{10}$ aliphatic diacids) that are extracted with an aromatic hydrocarbon solvent such as toluene. For such a treatment, the aqueous phase may be subjected to a temperature of about 100 to about 250° C. for a period of time sufficient to convert a substantial amount of the water-soluble organic acids to toluene-soluble acids. Particularly suitable conditions include a temperature of 130 to 150° C. for from ½ hour at 150° C. to two hours at 130° C. Following such a treatment, the resulting aqeous solution is solvent extracted with an aromatic hydrocarbon such as toluene whereby the organic acids now soluble in toluene are removed.

As aforesaid, the embodiment of Figure I is adaptable for practice of the invention in continuous manner with an aqueous phase, derived from a process as aforedescribed, in which the initial metalation reaction is carried out in the absence of an attrition agent or with an attrition agent that is water-insoluble. As shown, the reaction mixture from the metalator is passed to the carbonator into which carbon dioxide is introduced. The effluent from the carbonator is treated, by suitable means such as evaporation, filtration, etc., to remove the reaction medium (e. g., dimethyl ether) and carbon dioxide, and the carbonated mixture is then passed into a hydrolyzer to destroy, in the hydrolyzer, unreacted alkali metal present in the carbonator effluent passed to the hydrolyzer and to dissolve water-soluble organic salts present in the carbonator effluent. The aqueous mixture from the hydrolyzer is filtered, especially when a water-insoluble attrition agent has been used, and the filtrate is passed to a hydrogenator wherein the aqueous solution containing the water-soluble salts is subjected to hydrogenation. From the hydrogenator, the hydrogenated product is filtered to remove solid components (i. e., hydrogenation catalyst) and to the filtrate is added an acid (e. g., sulfuric acid, hydrochloric acid, etc.) and, preferably, a suitable aromatic solvent (e. g., toluene), the acid serving to neutralize the organic acid salts in the aqueous solution and the hydrocarbon serving to minimize the solution of inorganic salts in the resulting organic phase containing the bulk of the free acids resulting from neutralization of the alkali metal salts of the carboxylic acids. In the neutralization reaction, there is formed an inorganic salt and which, in neutralization using sulfuric acid, is an alkali metal sulfate which dissolves in the aqueous phase. Thus, there is produced an organic phase containing the bulk of the desired acids in solution and an aqueous phase. In practice of such a process, it has been found that the aqueous phase contains, in addition to water-soluble inorganic salts formed in the neutralization operation, a small but nevertheless a valuable concentration of organic acids, including water-soluble organic acids that are not substantially, if at all, soluble in the hydrocarbon phase. Also generally present in such an aqueous phase are a multiplicity of contaminant metals, including heavy metals such as iron, nickel, chromium, molybdenum, lead, copper, manganese, tin, etc.

The aqueous phase from which the toluene soluble acids have been removed is heated to 150° C. for ½ hour and is then solvent extracted with toluene whereby there is obtained a toluene phase containing the organic acids in the water phase which are converted to toluene-soluble organic acids by the heat treatment. The aqueous phase is then adjusted to a pH of 8 to 10 and preferably to a pH of 8.5 to about 9 by addition of caustic to convert the dissolved organic acids to their corresponding water-soluble salts while at the same time precipitating the contaminant heavy metals in the form of compounds insoluble in the alkaline solution. The resulting aqueous phase is then subjected to a treatment suitable for removal, following removal of precipitated metal salts, of water-soluble inorganic salts (e. g., sodium sulfate) formed during the neutralization treatment. Thus, the resulting aqueous phase which contains dissolved inorganic salts and salts of organic acids but substantially devoid of contaminant metals, is subjected to an evaporation treatment such as submerged combustion, thermal evaporation, etc. to crystallize inorganic salts (e. g., sodium sulfate) with the crystallization treatment being carried out to an extent such that a substantial amount of the inorganic salts crystallize out but not to the extent of deleteriously affecting or substantially removing organic salts thereby leaving an aqueous phase that contains an increased concentration of the organic acid salts. Preferably, the aqueous phase is concentrated until the organic acid content is increased to more than about 5% by weight. A portion of such an aqueous phase is recycled to the process at a stage following the removal of heavy metal contaminants and the remainder is processed by acidification to a pH of from about 1 to about 3 to liberate the organic acids from their salts. The acidified solution is then subjected to a treatment, such as decantation, whereupon the organic acids separate out as an upper layer leaving a lower aqueous solution containing dissolved inorganic salt (e. g., sodium sulfate) which is recycled in the process. Preferably, and as shown in Fig. I, the aqueous solution is recycled to the acid recovery step wherein the product from the hydrogenation step is treated with a mineral acid to liberate the hydrogenated acids from their salts and preferably, in presence of a suitable hydrocarbon to produce an organic phase as aforediscussed and an aqueous phase such as is used for the treatment embodied herein for contaminant metal removal and the subsequent processing as aforedefined.

As aforesaid, the embodiment of Figure II is adapted for practice of the invention wherein the aqueous phase is derived from a process as aforedescribed in which the initial metalation reaction is carried out with a water-soluble attrition agent; as for example, sodium sulfate, sodium chloride, etc. As shown in Figure II, the process is similar to that described in Figure I except that in this case the aqueous phase from the acid recovery step contains in solution the water-soluble attrition agent plus water-soluble inorganic salts formed in the neutralization step. For purposes of illustration, by use of sodium sulfate as the attrition agent and use of $H_2SO_4$ for the neutralization step, the aqueous phase contains in solution the attrition agent and the water-soluble salt (e. g., alkali metal sulfate) formed in the process. In accordance with this invention, the aqueous phase from such an embodiment is subjected to the subsequent treatments as described with reference to the process of Figure I except that the inorganic salt (sodium sulfate) from the inorganic salt recovery step is dried and an appropriate amount recycled to the metalation step.

In the formation of sodium sulfate in the neutralization step and/or use of sodium sulfate as attrition agent, the crystallization in the inorganic salt recovery step is preferably effected by use of a submerged combustion operation wherein the aqueous phase from which metal contaminants have been removed is contacted with an open flame. The crystals of sodium sulfate that result are withdrawn, and dried. A portion of the dried sodium sulfate substantially equivalent to that derived from the attrition agent, is returned to the metalation step and the remainder (substantially equivalent to the amount of inorganic salt formed during the neutralization step) is withdrawn from the system as sodium sulfate of substantially high purity.

By practice of the invention as aforedescribed, numerous advantages have been found to result. Firstly, the desired soluble organic acids that would normally be removed from the system in the aqueous phase are recovered by the disclosed treatment of the aqueous phase. Secondly, the inorganic salts formed in the neutralization step are recovered as products of substantially high purity and; thirdly, when use is made of a water-soluble attrition agent, it is recovered from the system in a form useful for reuse in the metalation reaction or as a purified product for other purposes. Moreover, and also of particular importance, the entire aforedescribed process can be carried out without a substantial waste disposal problem that generally exists in recovery processes for organic acids in aqueous phase.

In further illustration of the invention, a specific embodiment thereof is described hereinafter in its use with a system as set forth in Figure I in which the metalation reaction is carried out by use of a sodium dispersion prepared as follows. Unless otherwise set forth, amounts of materials utilized in the process are expressed in parts by weight.

A mixture of 200 parts of sodium and 562 parts of a $C_{12}$ alkylate is heated until the sodium melts (M. P. 97.5° C.) and the resulting mixture is subjected to vigorous agitation. Four parts of aluminum stearate is then added whereby a sodium dispersion is produced in which the particle size of the sodium is in the range of 5 to 15 microns. The aforesaid dispersion is introduced into the metalator along with 2,000 parts of dimethyl ether (precooled to −30° C.), 473 parts of butadiene and 1 part of terphenyl. The metalation reaction occurs rapidly to produce a slurry comprising selectively formed disodio derivatives of octadienes and a small amount of intermediate products including sodiobutenes, sodiooctadienes and other sodio alkenes. The reaction mixture from the metalator is then passed to a carbonator into which gaseous carbon dioxide is introduced in an amount substantially in excess of that theoretically required to carbonate the sodio derivatives in the metalation reaction product. The carbonator effluent, comprising disodium salts of $C_{10}$ unsaturated aliphatic diacids (3,7-decadienedioic acid, 7-vinyl-3-octenedioic acid and 2,5-divinyladipic acid) and a small amount of monobasic unsaturated acids $C_5$, $C_9$, $C_{13}$, and higher, dimethyl ether and minor amounts of by-product hydrocarbons is then subjected to an elevated temperature (120° C.) whereby substantially complete evaporation of the dimethyl ether and excess carbon dioxide is effected. The carbonator effluent, from which the ether and carbon dioxide is removed, is then admixed in the hydrolyzer with an excess of hot water whereby unreacted sodium present in the carbonator effluent is destroyed and water soluble sodium salts of the organic acids are dissolved. The aqueous solution from the hydrolyzer is filtered to insure removal of solid materials (e. g., water-insoluble polymers that may have formed) and the aqueous filtrate is then subjected to hydrogenation using 2% of nickel as a hydrogenation catalyst. There is thus produced an aqueous solution of the corresponding saturated salts of the unsaturated salts subjected to hydrogenation. The aqueous solution from the hydrogenator is then subjected to filtration to remove solid materials (e. g., hydrogenation catalyst). To the filtrate, toluene and sulfuric acid are added, the amount of toluene being in the ratio of two parts per part or organic acids in the filtrate and the sulfuric acid in an amount sufficient to neutralize the salts of the organic acids in the filtrate. There results from such treatment of the hydrogenated product (1) an organic phase containing about 90% by weight of the organic acids liberated by the neutralization treatment and (2) an aqueous phase (pH=2) comprising in solution the remainder of the organic acids and the sodium sulfate formed in the neutralization of the sodium salts by sulfuric acid, such an aqueous phase containing about 1.4 pounds/gel. of sodium sulfate and about 0.2 pounds/gel. of water-soluble organic acids, i. e., about a 14% solution of sodium sulfate and about a 2% solution or organic acids that were not extractable with toluene. Such an aqueous solution is heated for one-half hour at 150° C. whereby, of the organic acids that were not extractable with toluene, about forty percent of such organic acids are converted to toluene-extractable organic acids which are then removed from the aqueous phase by toluene extraction leaving an aqueous phase containing about 1.2% of organic acids and sodium sulfate in the aforestated concentration. Such a toluene extract is then, preferably combined with the organic acid phase obtained from the aforedescribed neutralization step. The resulting aqueous phase is then made alkaline (pH 8.5) by addition of sodium hydroxide and filtered whereby a filter cake is obtained containing heavy metal salts including salts of iron, chromium, nickel, copper, lead, molybdenum, aluminum, etc.

The resulting aqueous filtrate from which contaminated metals have been removed is heated to (e. g., to 100° C.) to evaporate water until the aqueous solution is decreased in sodium sulfate content from 1.4 to about 1.0 pounds/gel. and the organic salt content increased from 0.12 to about one pound per gallon. During the concentration of the aqueous solution, crystallization of sodium sulfate occurs which is removed by centrifugation. The sodium sulfate is then dried and recovered as highly pure, white crystalline material, as compared to a yellowish-brown metal-contaminated sodium sulfate that is normally obtained when the aqueous phase from the acid recovery step is subjected to evaporation to dryness rather than to the aforedescribed process.

The aqueous phase containing the increased concentration of organic acid salts and dissolved sodium sulfate is then recycled to the process subsequent to the filtration step for removal of heavy metal contaminants but not later than the water evaporation step, except for a minor amount (e. g., about 10%) which, instead of being thus recycled is acidified with a mineral acid (e. g., sulfuric acid) to a pH of about 2. The resulting acidified product, containing liberated organic acids and sodium sulfate in solution, is passed into a decanter wherein an upper layer forms containing the organic acids, including adipic acid. The lower layer formed in the decanter consists essentially of an aqueous sodium sulfate solution which may be recycled to the process at the stage wherein the product from the hydrogenator is neutralized, i. e., to the acid recovery step in the process of Figure I.

As to the liquid hydrocarbon that may be used in the neutralization step, toluene is highly suitable but other liquid aromatic hydrocarbons may be used, such for example, as benzene, xylene, ethylbenzene, cumene, etc. In general, and with specific application for preparation of $C_{10}$ aliphatic saturated diacids by a process as aforedescribed, the liquid aromatic hydrocarbon employed is selected from aromatic hydrocarbons that selectively dissolve a major amount, as for example, up to about 90%, by weight or more, of the $C_{10}$ saturated carboxylic acids produced in the process.

While there is above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. In a process for producing and recovering organic acids by reacting finely divided alkali metal with an aliphatic conjugated diolefin to form alkali metal hydrocarbons including dialkali metal dimers of the diolefin, reacting the resulting reaction mixture with carbon dioxide to convert the alkali metal hydrocarbon to alkali metal organic acid salts, neutralizing the resulting salts in an aqueous medium to liberate the organic acids from their salts with formation of the corresponding alkali metal salt of the neutralization agent, and recovering said organic acids and said salt of the neutralization agent from the aqueous medium in which the neutralization is carried out, the improvement providing improved recovery of said organic acids and the alkali metal salt of the neutralization agent which comprises separating toluene-soluble organic acids from the aqueous neutralized mixture thereby providing an aqueous mixture comprising water-soluble organic acids and the alkali metal salt of the neutralization agent, heating said aqueous mixture of water-soluble acids and alkali metal salt at an elevated temperature up to about 250° C. for a period of time sufficient to convert a substantial amount of the water-soluble organic acid to toluene-soluble acids, separating the toluene-soluble organic acids from said heat-treated aqueous mixture, thereby providing an aqueous heat-treated mixture of water-soluble substantially toluene-insoluble organic acids and the alkali metal salt of the neutralization agent, adding to the resulting aqueous heat-treated mixture an alkaline agent in an amount sufficient to convert the organic acids to their corresponding salts of the alkaline agent and to precipitate heavy metals present in said aqueous heat-treated mixture, removing the thus precipitated heavy metals thereby providing a substantially heavy metal-free aqueous mixture of water-soluble organic acids and salt of the neutralization agent, removing water from said substantially heavy metal-free aqueous mixture in an amount sufficient to precipitate out a substantial portion of the salt of the neutralization agent and providing an aqueous phase containing an increased concentration of the organic acid salts, removing the precipitated salt of said neutralization agent, recycling a portion of said aqueous phase of increased concentration of organic acid salts to the process at a stage following removal of heavy metals but prior to the step of removing water for crystallizing out the salt of the neutralization agent, acidifying the remainder of the aqueous phase of increased concentration of organic acid salts to liberate the organic acids from their salts, and recovering said liberated organic acids.

2. A process, as defined in claim 1, wherein the organic acids, liberated from the aqueous phase of increased concentration of organic acid salts, are recovered by decantation from the acidified aqueous phase of increased concentration of organic acid salts.

3. A process, as defined in claim 1, wherein, following the reaction with $CO_2$ to convert the alkali metal hydrocarbons to alkali metal organic acid salts, the resulting carbonated mixture is hydrogenated to saturate the unsaturated salts in the carbonated mixture.

4. A process, as defined in claim 1, wherein the alkali metal is sodium, the diolefin is butadiene, the neutralization is carried out with a mineral acid, the alkaline agent for adjustment of pH of the heat-treated mixture is caustic, the removal of water for precipitation of the salt of the neutralizing agent is carried out by evaporating water, and liberation of the organic acids from the aqueous phase of increased concentration of organic acid salts is carried out by acidification with a mineral acid.

5. A process, as defined in claim 1, wherein the reaction between the alkali metal and diolefin is carried out in presence of a water-soluble attrition agent, the water-soluble attrition agent is precipitated out in the step wherein the salt of the neutralization agent is precipitated out, and the precipitated out attrition agent is dried and recycled to the step wherein the alkali metal is reacted with the diolefin.

6. A process, as defined in claim 1, wherein the aqueous phase, resulting from liberation of the organic acid from their salts in the aqueous phase of increased concentration of organic acids, is recycled to the neutralization step of the defined process.

7. In a process for producing and recovering organic acids by reacting finely divided sodium with butadiene in an ether reaction medium at a temperature below about 0° C. to produce a mixture of sodiohydrocarbons including isomeric disodiooctadienes, reacting the resulting reaction mixture with carbon dioxide to convert the sodiohydrocarbons to sodium salts of organic acids including disodium salts of $C_{10}$ unsaturated diacids, removing excess carbon dioxide and ether reaction medium from the carbonated reaction mixture, hydrogenating the carbonated mixture in an aqueous medium to saturate the unsaturated salts, neutralizing the aqueous hydrogenated mixture with a mineral acid in the presence of a liquid aromatic hydrocarbon solvent that preferentially extracts the saturated $C_{10}$ aliphatic diacids liberated from their salts by neutralization with said mineral acid thereby providing a solvent phase containing up to about 90% of the liberated organic acids and an aqueous phase comprising the remainder of the organic acids and the water-soluble sodium salt of the mineral acid used in the neutralization, the improvement providing for improved recovery from such a process of the organic acids and the sodium salt of the mineral acid used for the neutralization treatment which comprises subjecting the aqueous phase from the neutralization treatment to a temperature of from about 100 to about 250° C. for a period of time sufficient to convert a substantial amount of the organic acids to toluene-soluble organic acids, separating the resulting toluene-soluble organic acids from the heat-treated aqueous phase thereby providing an aqueous heat-treated phase containing water-soluble toluene-insoluble organic acids and the sodium salt of the mineral acid used for the neutralization step, adding caustic to the heat-treated aqueous phase from which toluene-soluble organic acids have been removed to adjust the pH to from about 8 to about 10 whereby the water-soluble organic acids are converted to sodium salts and heavy metal contaminants are precipitated, removing the precipitated heavy metals thereby providing a substantially heavy metal-free aqueous mixture of water-soluble organic acids and the sodium salt of the mineral acid used in the neutralization step, evaporating water from the substantially heavy metal-free aqueous mixture in an amount sufficient to precipitate out a substantial portion of the sodium salt of the mineral acid used for the neutralization treatment thereby providing an aqueous phase containing an increased concentration of the organic acid salts, removing the precipitated salt of the mineral acid used in the neutralization step, recycling a portion of the said aqueous phase of increased concentration to the process at a stage following removal of the heavy metals but prior to the step of evaporation of water to crystallize out the salt of the mineral acid, acidifying the remainder of the aqueous phase of increased concentration of organic acid salts to liberate the organic acids from their salts, and recovering said liberated organic acids.

8. A process as defined in claim 7, wherein the mineral acid used in the neutralization step is sulfuric acid, the selective solvent for the $C_{10}$ diacids is toluene, the acidification of the aqueous phase of increased concentration of organic acid salts is carried out by addition of a mineral acid, the resulting liberated organic acids are recovered by decantation, and the aqueous phase from the decantation step is recycled to the neutralization step.

References Cited in the file of this patent

UNITED STATES PATENTS

| | | |
|---|---|---|
| 2,352,461 | Walker | June 27, 1944 |
| 2,680,713 | Lindsey et al. | June 8, 1954 |
| 2,749,364 | Greenberg | June 5, 1956 |
| 2,773,092 | Carley et al. | Dec. 4, 1956 |

OTHER REFERENCES

Tipson, Tech. of Org. Chem., vol. III (edited by Weissberger) (1950), pp. 481–2, 420–26.

Groggins, Unit Processes in Organic Synthesis (1952) pp. 488–92.